United States Patent
Rinne et al.

(10) Patent No.: US 7,848,236 B2
(45) Date of Patent: Dec. 7, 2010

(54) DIFFERENTIATION OF QUALITY CLASSES TO DIFFERENT PDUS WITH SUPPORT FOR MULTIPLE TERMINALS

(75) Inventors: Mikko J. Rinne, Espoo (FI); Jari Jokela, Ylöjärvi (FI)

(73) Assignee: Nokia Corporation, Espoo (FI)

(*) Notice: Subject to any disclaimer, the term of this patent is extended or adjusted under 35 U.S.C. 154(b) by 1374 days.

(21) Appl. No.: 10/984,853

(22) Filed: Nov. 10, 2004

(65) Prior Publication Data
US 2006/0034331 A1 Feb. 16, 2006

(30) Foreign Application Priority Data
Aug. 10, 2004 (EP) .................................. 04018963

(51) Int. Cl.
H04L 12/26 (2006.01)
G06F 15/16 (2006.01)
(52) U.S. Cl. ....................... 370/235; 370/412; 370/469; 709/234
(58) Field of Classification Search .................. None
See application file for complete search history.

(56) References Cited

U.S. PATENT DOCUMENTS

| | | | |
|---|---|---|---|
| 6,697,352 B1 * | 2/2004 | Ludwig et al. | 370/349 |
| 7,324,553 B1 * | 1/2008 | Varier et al. | 370/468 |
| 7,385,924 B1 * | 6/2008 | Riddle | 370/235 |
| 7,433,943 B1 * | 10/2008 | Ford | 709/223 |
| 2003/0081592 A1 * | 5/2003 | Krishnarajah et al. | 370/352 |

FOREIGN PATENT DOCUMENTS

EP 0975123 A1 1/2000

OTHER PUBLICATIONS

Communication pursuant to Article 94(3) EPC dated Feb. 9, 2010, issued by the European Patent Office in connection with counterpart European application No. 05764224.1.

* cited by examiner

*Primary Examiner*—Ricky Ngo
*Assistant Examiner*—Clemence Han
(74) *Attorney, Agent, or Firm*—Mintz Levin Cohn Ferris Glovsky and Popeo, P.C.

(57) ABSTRACT

The present invention concerns a method of configuring quality parameters in a packet-based transmission flow for packets within the flow, and still further a method of transmitting packet-based transmission flows comprising packets of configured quality classes within a session capable of handling at least two distinguishable flows, the method comprising the steps of: receiving packets of a first flow as a first flow of the session, analyzing the received packets in terms of the configured quality classes, separating those segments of the packets of a configured quality class, which configured quality class differs from a quality class of said first flow of the session. Also, a corresponding reception method is disclosed, and respective transmitter and receiver devices are disclosed.

35 Claims, 7 Drawing Sheets

FIG. 3 "Transmitting"

FIG. 6
"Receiving"

FIG. 7

DIFFERENTIATION OF QUALITY CLASSES TO DIFFERENT PDUS WITH SUPPORT FOR MULTIPLE TERMINALS

FIELD OF THE INVENTION

The present invention addresses a method of configuring quality parameters in a packet-based transmission flow for packets within the flow, and a method of transmitting packet-based transmission flows comprising packets of configured quality classes within a session capable of handling at least two distinguishable flows. Also, a method of receiving correspondingly transmitted flows is concerned. Further, corresponding transmitter and receiver devices are concerned.

In particular, the present invention relates to differentiation of quality classes to different protocol data units (PDUs) with support for multiple terminals.

BACKGROUND OF THE INVENTION

Providing optimal service on the radio interface is an important aspect in mobile communication. In particular for packet-based traffic which has become more and more popular in the recent years due to the widely adopted Internet protocol as an example of a packet-based transmission protocol, optimizations for packet-based traffic consisting of data with varying quality requirements are demanded.

Certain applications, such as audio or video codecs, can be optimized by defining different quality classes for different bitfields, i.e. some fields are more important than others. Typically, protocol header fields (of all packets within a flow) require better protection than the data payload and are specifically protected, for example by using an extra cyclic redundancy check (CRC) code.

Another possibility is that different packets as such, within a packet flow, have different quality requirements based on the content of their payload section. However, until now no optimized and generic delivery mechanism in the packet domain has existed to take these differences into account.

In 2G and 3G cellular systems, this kind of support for different classes of quality of service is implemented for circuit-switched traffic.

Especially noteworthy is the GSM solution, where the most important bits are placed close to the training sequence midamble in a GSM burst, to get the maximum benefit from a good channel estimate. WCDMA supports radio bearer subflows, especially for use with adaptive multirate (AMR) speech audio codecs, for which every speech frame is split into three quality classes, which are then separately coded based on their quality requirements and optimally transmitted over the air interface.

A common characteristic for both, GSM and WCDMA approaches, is that the radio bearer subflows are configured statically prior to the transmission, either explicitly according to the specification, or by means of a radio bearer setup before the transmission starts.

For circuit-switched systems, the "radio bearer subflows" that receive different treatment on the physical layer, have to be pre-negotiated in the radio bearer setup.

Packet-based, i.e. packet-switched transmission differs significantly from circuit-switched transmission. Namely, in packet-based transmission, a flow might contain a stream of packets consisting entirely of a certain quality level, e.g. quality level 1 (Q1), with an occasional packet of different quality level, e.g. quality level 2 (Q2).

However, hitherto known scenarios cannot cope with such a situation. For the support of different quality classes of packets within a flow, a preceding setup signaling procedure to establish a radio bearer or radio bearer subflow for each targeted quality level is required. Furthermore, no packet-based solution for supporting different quality classes within an upper protocol layer packet is available in either GSM or WCDMA. In the circuit-switched solution the different subflows arrive separately to the radio link layer, and therefore no separation needs to be done by the radio link layer.

SUMMARY OF THE INVENTION

Hence, it is an object of the present invention to solve the above drawbacks inherent to the prior art involved with packet based transmissions having packets requiring a different quality of service.

According to an aspect of the present invention, this object is for example achieved by a method of configuring quality parameters
in a packet-based transmission flow for packets within the flow,
the method comprising the steps of:
offering a transmission request primitive from a first protocol layer to a second protocol layer from which the packet-based transmission flow is to be received; wherein
the transmission request primitive comprises at least one parameter for indicating at least one quality parameter for the packets within the packet-based transmission flow;
deciding at said second protocol layer on the quality parameters for the packets within the flow,
setting the at least one parameter of the transmission request primitive according to the decided quality; and
informing the set at least one parameter to the first protocol layer.

According to favorable further developments of this aspect of the invention
said transmission request primitive is a flow establishment primitive;
with said flow establishment primitive being set and informed to said first layer, quality parameters for all packets within the flow are configured to have the same properties;
said transmission request primitive is a data request primitive;
with said data request primitive being set and informed to said first layer, a quality parameter for a packet within the flow is configured to have an individual property;
said data request primitive comprises at least a parameter associated to packet quality level;
said data request primitive comprises at least one further parameter associated to an intra-packet segment quality level;
said at least one further parameter associated to an intra-packet segment quality level comprises
a starting point parameter indicating a starting point of a specific quality of service within the packet; and at least one of:
an ending point parameter indicating an end point of a specific quality of service within the packet;
a length indicator indicating an end point of a specific quality of service within the packet with reference to the starting point.

According to another aspect of the present invention, this object is for example achieved by a method of transmitting packet-based transmission flows comprising packets of configured quality classes (Q1, Q2, Q3) within a session capable of handling at least two distinguishable flows (F1, F2), the method comprising the steps of:

receiving, at a first protocol layer, packets (SDU) of at least one flow (Flow1, Flow2) as an at least first flow of the session, from a second protocol layer, analyzing, at said first layer, the received packets in terms of the configured quality classes (Q1, Q2; Q1, Q2, Q3), separating, from said at least first flow, those segments of the packets of a configured quality class (Q2; Q2, Q3), which configured quality class differs from a quality class (Q1) associated to said at least first flow of the session.

According to favorable further developments of this aspect of the invention said separating further comprises a step of arranging separated segments of packets to at least one other flow (Flow2, Flow3) of the session;

said arranging comprises that the separated segments (Q2, Q3) are switched to said at least one other flow and are received as packets of a flow (Flow2) of the session, the received separated segments (Q2, Q3) are analyzed in terms of the configured quality classes, and those segments (Q3) of the packets of a configured quality class, which configured quality class differs from a quality class (Q2) preset for said another flow (Flow2) of the session are separated from said at least one other flow (Flow2);

said arranging further comprises a step of switching separated segments (Q2, Q3) of the packets to a respective selected at least one other flow (Flow2, Flow3) of the session, wherein the respective selected at least one other flow (Flow2, Flow3) has a quality class (Q2; Q3) preset which matches the quality class of the separated segments;

said arranging further comprises a step of establishing a new flow (Flow3) of the session in case that there is no flow present, to which separated segments can be arranged to;

said arranging further comprises a step of establishing a new flow (Flow3) of the session in case that there is no flow present having a quality class preset which matches the quality class of the separated segments, to which separated segments can be switched to;

the method further comprises a step of generating a header (QPDU) for each flow of the session from which segments were separated;

the method further comprises a step of generating a header (QPDU) for each flow of the session to which segments were arranged;

said header comprises a header field for each payload segment within said flow;

a quality class of a flow of the session is set upon flow establishment;

the header field for each payload segment contains at least a flow identity of the flow from which said segment originates.

According to a still further aspect of the present invention, the above object is achieved by a method of receiving packet-based transmission flows comprising segments of packets within a session capable of handling at least two distinguishable flows, the method comprising the steps of:

receiving, in a peer-to-peer communication at a first protocol layer, segments of packets (QPDU) of at least one flow (Flow1, Flow2) as an at least first flow of the session, analyzing, at said first protocol layer, the received segments of packets in terms of a flow identity associated to each segment, and separating from said at least first flow of the session those segments of the packets having a flow identity which differs from the flow identity of said at least first flow of the session.

According to favorable further developments of this aspect of the invention said separating further comprises a step of arranging separated segments of packets to at least one other flow (Flow2) of the session;

said arranging comprises combining those separated segments of packets to segments of packets of a respective other one of said flows of the session having a flow identity which is identical to the flow identity associated to the separated segments of the packets;

said arranging comprises that the separated segments (Q2, Q3) are switched to said at least one other flow (Flow2) and are received as packets of a flow (Flow2) of the session, the received separated segments (Q2, Q3) are analyzed in terms of the associated flow identity, and those segments of the packets of a specified flow identity, which associated flow identity differs from a flow identity preset for said another flow (Flow2) of the session are separated from said at least one other flow (Flow2);

the method further comprises a step of switching those separated segments (Q2, Q3) of the packets to a respective selected at least one other flow (Flow2, Flow3) of the session, wherein the respective selected at least one other flow (Flow2, Flow3) has a flow identity preset which is identical to the flow identity of the separated segments;

said arranging further comprises a step of de-establishing a flow of the session in case the flow identity associated to all segments of packets of the flow differs from the flow identity associated to the flow;

said received at least one flow comprises a header comprising a header field for each payload segment;

a flow identity of a flow of the session is set upon flow establishment;

said header field for each payload segment contains a flow identity associated to the respective segment.

Although the above focused on the respective methods conceived according to the present invention, it is to be understood that the object underlying the present invention is achieved also by a correspondingly adapted respective device.

In detail, according to a further aspect of the present invention, this object is achieved by a device for configuring quality parameters in a packet-based transmission flow for packets within the flow, the device comprising:

an inter-protocol layer communication means (S1, S4) configured to offer (S1) a transmission request primitive from a first protocol layer to a second protocol layer from which the packet-based transmission flow is to be received; wherein the transmission request primitive comprises at least one parameter for indicating at least one quality parameter for the packets within the packet-based transmission flow;

an intra-protocol layer control means (S2, S3)
configured to decide at said second protocol layer on the quality parameters for the packets within the flow, and
configured to set the at least one parameter of the transmission request primitive according to the decided quality; and wherein said inter-protocol layer communication means is configured to inform (S4) the set at least one parameter to the first protocol layer.

Moreover, the object is achieved by
a transmitter for transmitting packet-based transmission flows comprising packets of configured quality classes (Q1, Q2, Q3) within a session capable of handling at least two distinguishable flows (F1, F2), the transmitter comprising:

an internal receiver configured to receive, at a first protocol layer, packets (SDU) of at least one flow (Flow1, Flow2) as an at least first flow of the session, from a second protocol layer, an analyzer configured to analyze, at said first layer, the received packets in terms of the configured quality classes (Q1, Q2; Q1, Q2, Q3), a separator configured to separate, from said at least first flow, those segments of the packets of a configured quality class (Q2; Q2, Q3), which configured quality class differs from a quality class (Q1) associated to said at least first flow of the session.

According to further developments of the transmitter
said separator further comprises an internal switch configured to arrange separated segments of packets to at least one other flow (Flow2, Flow3) of the session.

said internal switch is configured such that the separated segments (Q2, Q3) are switched to said at least one other flow and are received as packets of a flow (Flow2) of the session at a further internal receiver which is configured such that the received separated segments (Q2, Q3) are analyzed in terms of the configured quality classes, and a further separator which is configured such that those segments (Q3) of the packets of a configured quality class, which configured quality class differs from a quality class (Q2) preset for said another flow (Flow2) of the session are separated from said at least one other flow (Flow2);

said internal switch is configured to switch separated segments (Q2, Q3) of the packets to a respective selected at least one other flow (Flow2, Flow3) of the session, wherein the respective selected at least one other flow (Flow2, Flow3) has a quality class (Q2; Q3) preset which matches the quality class of the separated segments;

said internal switch is configured to establish a new flow (Flow3) of the session in case that there is no flow present, to which separated segments can be arranged to;

said internal switch is configured to establish a new flow (Flow3) of the session in case that there is no flow present having a quality class preset which matches the quality class of the separated segments, to which separated segments can be switched to;

the transmitter further comprises a generating means configured to generate a header (QPDU) for each flow of the session from which segments were separated;

the transmitter further comprises generating means configured to generate a header (QPDU) for each flow of the session to which segments were arranged;

said generating means is configured to compose the header such that the header comprises a header field for each payload segment within said flow;

the transmitter comprises a setting means configured to set a quality class of a flow of the session upon flow establishment;

the header field for each payload segment contains at least a flow identity of the flow from which said segment originates.

Moreover, the object is achieved by
a receiver for receiving packet-based transmission flows comprising segments of packets within a session capable of handling at least two distinguishable flows, the receiver comprising:

a receiving means configured to receive, in a peer-to-peer communication at a first protocol layer, segments of packets (QPDU) of at least one flow (Flow1, Flow2) as an at least first flow of the session, an analyzer configured to analyze, at said first protocol layer, the received segments of packets in terms of a flow identity associated to each segment, and a separator configured to separate from said at least first flow of the session those segments of the packets having a flow identity which differs from the flow identity of said at least first flow of the session.

According to further developments of the receiver
said separator further comprises an internal switch configured to re-arrange separated segments of packets to at least one other flow (Flow2) of the session;

said internal switch is configured to combine those separated segments of packets to segments of packets of a respective other one of said flows of the session having a flow identity which is identical to the flow identity associated to the separated segments of the packets;

said internal switch is configured such that the separated segments (Q2, Q3) are switched to said at least one other flow (Flow2) and are received as packets of a flow (Flow2) of the session, the received separated segments (Q2, Q3) are analyzed in terms of the associated flow identity, and those segments of the packets of a specified flow identity, which associated flow identity differs from a flow identity preset for said another flow (Flow2) of the session are separated from said at least one other flow (Flow2);

said internal switch is configured to switch those separated segments (Q2, Q3) of the packets to a respective selected at least one other flow (Flow2, Flow3) of the session, wherein the respective selected at least one other flow (Flow2, Flow3) has a flow identity preset which is identical to the flow identity of the separated segments;

said internal switch is configured to de-establish a flow of the session in case the flow identity associated to all segments of packets of the flow differs from the flow identity associated to the flow;

said received at least one flow comprises a header comprising a header field for each payload segment;

a flow identity of a flow of the session is set upon flow establishment;

said header field for each payload segment contains a flow identity associated to the respective segment.

As has become apparent from the foregoing, stated in other words, according to the present invention different flows or quality classes get different processing (=encoding) for the wireless transmission. This means that according to the present invention, one can split or combine flows based on quality and different transmitter/receiver processing can be applied to different flows.

Basically, with the present invention being implemented, a packet-based system gets the same potential benefit of variable Quality of Service, QoS, coding levels on the radio interface as circuit-switched systems have received until now.

By virtue of this invention applied to packet-based services, implementing an in-band signaling mechanism to adapt to different quality requirements on-the-fly is accomplished, without the necessity of prior signaling as in setting up radio bearers.

It is further to note that with header structures presented in this document, no peer-to-peer signaling with the receiving end is needed for proper reception and reconstruction.

DETAILED DESCRIPTION OF EMBODIMENTS OF THE INVENTION

Generally, a packet comprises a header and a payload section. The header contains information designating a "treatment" of the packet such as address information and the like necessary to handle the packets within a communication system comprising at least a transmitter and a receiver, and the payload contains the data to be transmitted for being used by the recipient (receiver), such as speech, audio, video or the like. Depending on the packet-based protocol, packets may have a different size, normally indicated in e.g. a number of bits, bytes, or octets. A packet as such may in turn be subdivided and composed of a plurality of segments. For example, the header of a packet may be regarded as a segment, and the payload section may be composed of one or more further segments. Segments within a packet can be addressed by using a relative address identifying the segment within the packet.

The present invention is applicable to any type of packet-based transmission protocol and not restricted to a specific protocol. References to specific protocols, if any, such as the Internet Protocol, whether IPv4 or IPv6, are to be understood as a mere example only in order to enhance the understanding of the present invention and to show that the present invention is easily enabled to be applied to various of such protocols.

Packet based communications are based on a connectionless service. That is, the transfer of information is allowed among service users without the need for end-to-end call establishment procedures. (A call here denotes a logical association between several users). That is, no connection (communication channel) needs to be established between the source and the destination entities before information can be exchanged between them.

Figure 1:
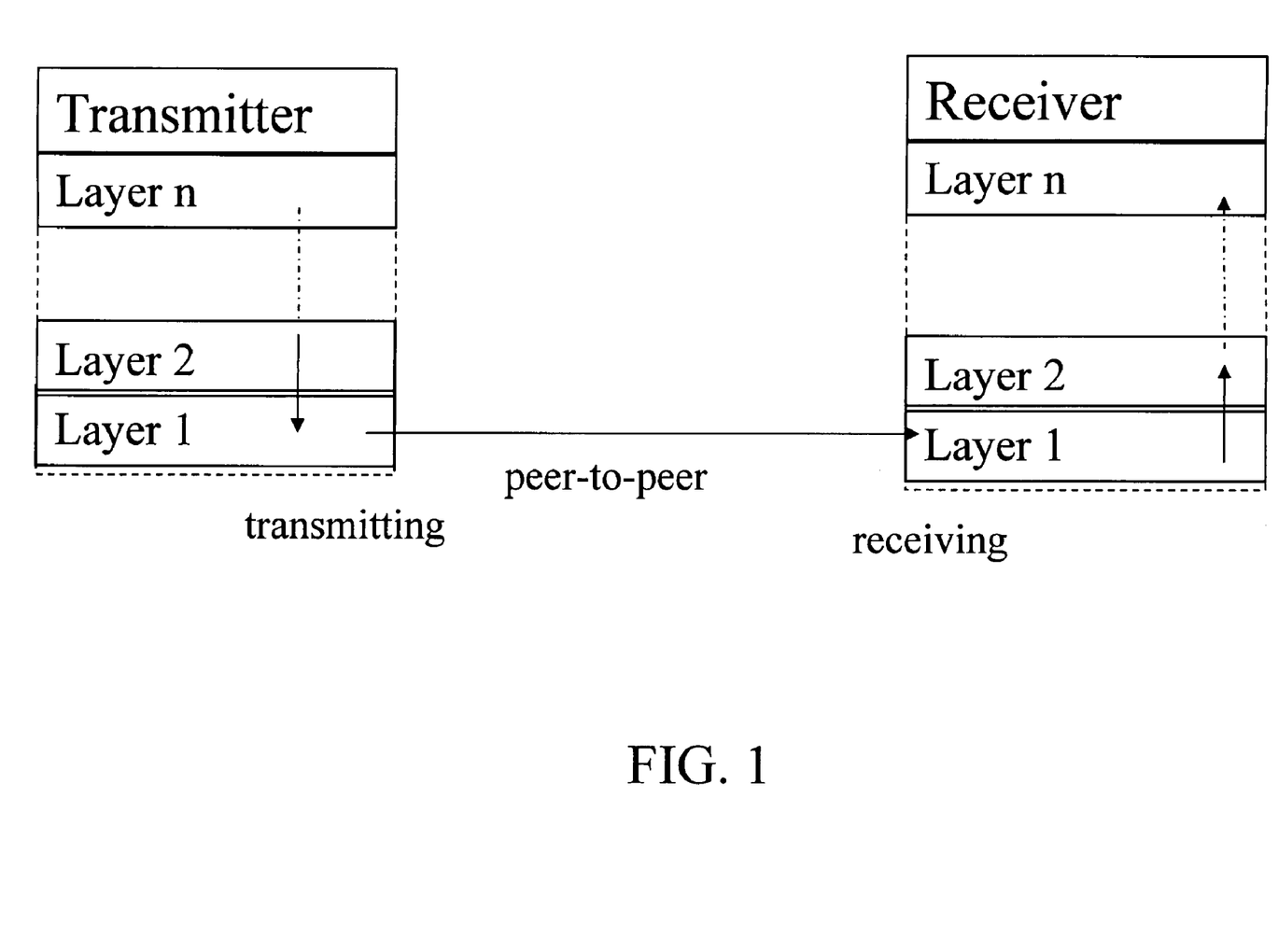
FIG. 1 illustrates a block circuit diagram of a transmitter and a receiver and protocol layers involved.

FIG. 1 shows conceptually a communication system consisting of at least one transmitter and at least one receiver. Each of these devices can of course also be a bidirectional device, i.e. a transmitter-receiver or transceiver. For example, a transmitter can be a base station or Node_B (downlink transmission) which transmits to a receiver, in such a case a mobile station or user equipment. In uplink transmission, the roles are exchanged, i.e. the mobile station or user equipment acts as a transmitter, whereas the base station or Node_B acts as a receiver. Each of these devices operates based on a layered communication model. Namely, layers as used herein denote protocol layers and first and second layers denote a hierarchical relation between the layers. A layer based communication is for example described in connection with the OSI reference model (Open System Interconnection). However, any other layer based communication different from and/or not based on the OSI model can be concerned by the present invention. FIG. 1 shows in general a layered communication model comprising n layers. Any communication taking place between a transmitter and a receiver on a same layer such as e.g. layer 1 is referred to as a peer-to-peer communication. The numbering of the layers was chosen as an example only. Even if the subsequent explanations refer to a first layer such as layer 1 and a second layer such as layer 2, it does not limit the invention to be actually restricted to these layers. Rather, it is intended to cover a case of two adjacent layers of different hierarchy. More generally, a layer n-(i) and n-(i+1) can be concerned. Internally within a transmitter a flow of information is vertically from a higher layer to a lower layer, between transmitter and receiver the flow of information is horizontally in a peer-to-peer communication, and internally within a receiver a flow of information is vertically from a lower layer to a higher layer, as shown in FIG. 1.

Figure 3:
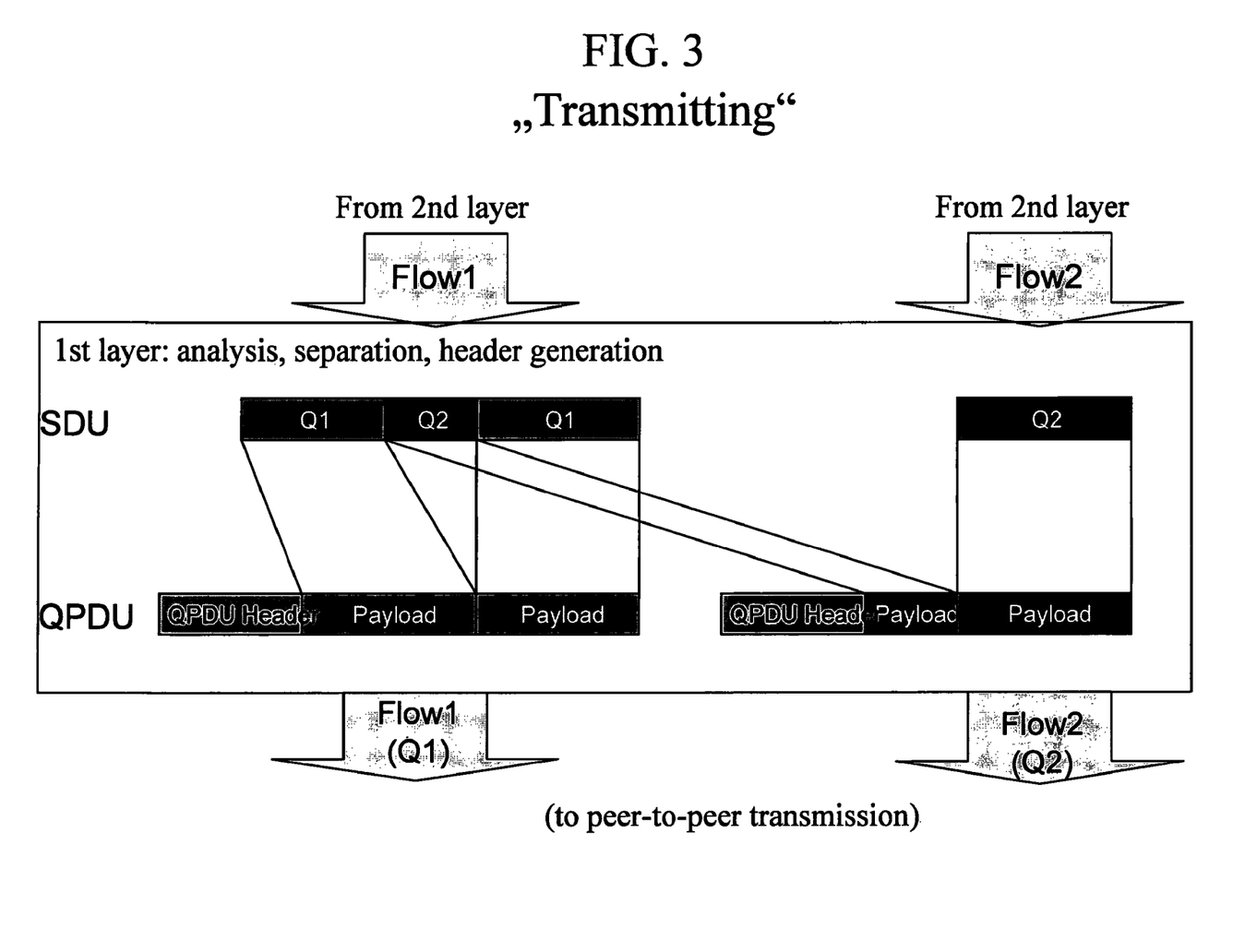
FIG. 3 illustrates a segmentation of Service Data Units (SDU:s) into different Quality Protocol Data Units (QPDU:s) as performed in a transmitter according to another aspect of the present invention.

For a preliminary explanation and introduction/definition of subsequently used terminology, reference is now made to FIG. 3. FIG. 3 illustrates a transmitter aspect of the present invention and shows a lower layer (e.g. layer 1) of a transmitter in terms of actions performed in accordance with the present invention due to the configuration of the transmitter.

FIG. 3 illustrates a segmentation of packets and/or of segments of packets denoted as Service Data Units (SDU:s) into different Quality Protocol Data Units (QPDU:s). FIG. 3 illustrates this as an example of separating different quality levels. It is to be noted that the situation illustrated in FIG. 3 refers to a session capable of handling at least two distinguishable flows. Flows are distinguishable at least according to the offered Quality of Service QoS, e.g. indicated in a bitrate, maximum admissible bit error rate, maximum admissible delay or any other transmission related parameters. Distinguishable flows are identifiable using a flow identifier or flow identity. In the shown scenario, the session comprises two flows, Flow_1 and Flow_2, which (received from an internal higher layer of the transmitter) are treated on a lower layer (first layer) by a respective processing entity.

Although in terms of a sequence of description the present description focuses firstly on a case in which packets are transmitted from a higher (second) layer to a lower (first) layer within a transmitter entity such as a base station BS or Node_B (in case of downlink transmission) or a mobile station MS or user equipment UE (in case of uplink transmission), the present invention is of course also applicable within a receiver entity such as a base station BS or Node_B (in case of uplink transmission) or a mobile station MS or user equipment UE (in case of downlink transmission) to be described later in this document. Of course, both operations always take place in any transmission activity. In the transmitting entity packets flow from higher to lower layer and in the receiving entity they flow from lower to higher. Even though the description focuses on the operation of the transmitting protocol layers, the method described herein enables the reverse operation in the receiving protocol layers.

Packets denoted as Service Data Units (SDU) are received from an upper layer (second layer). The SDU:s belong to distinguishable flows, Flow_1, Flow_2, which can be established and finished (terminated) during the lifetime, i.e. course of a session. A "SDU" as defined here represents whatever the underlying protocol is providing transport services for. It is to be noted that SDU defines a wider concept than a mere "packet", and is thus not at all confined to be a subclass of packets. Rather, a SDU comprises segments of packets and/or packets, and/or packet groups (a group of packets could be referred to as hyper packet, and groups of hyper packets could be referred to as super-packets).

$1^{ST}$ Aspect of the Invention: Quality Level Configuration:

The different quality levels such as those denoted by Q1, Q2 which are present in a flow (e.g. in Flow1 in FIG. 3) are configured by the upper layer as explained herein below.

Basic Embodiment of Quality Level Configuration:

Therefore under this respect, generally spoken, the present invention proposes a method of configuring quality parameters in a packet-based transmission flow for packets within the flow, the method comprising the steps of offering (S1) a transmission request primitive from a first protocol layer to a second protocol layer from which the packet-based transmission flow is to be received; wherein the transmission request primitive comprises at least one parameter for indicating at least one quality parameter for the packets within the packet-based transmission flow; deciding (S2) at said second layer on the quality parameters for the packets within the flow, setting (S3) the at least one parameter of the transmission request primitive according to the decided quality; and informing (S4) the set at least one parameter to the first layer.

In a subsequent step S5, the second (upper) layer then performs a flow transmission according to the transmission request primitive with the set parameters.

Figure 2:
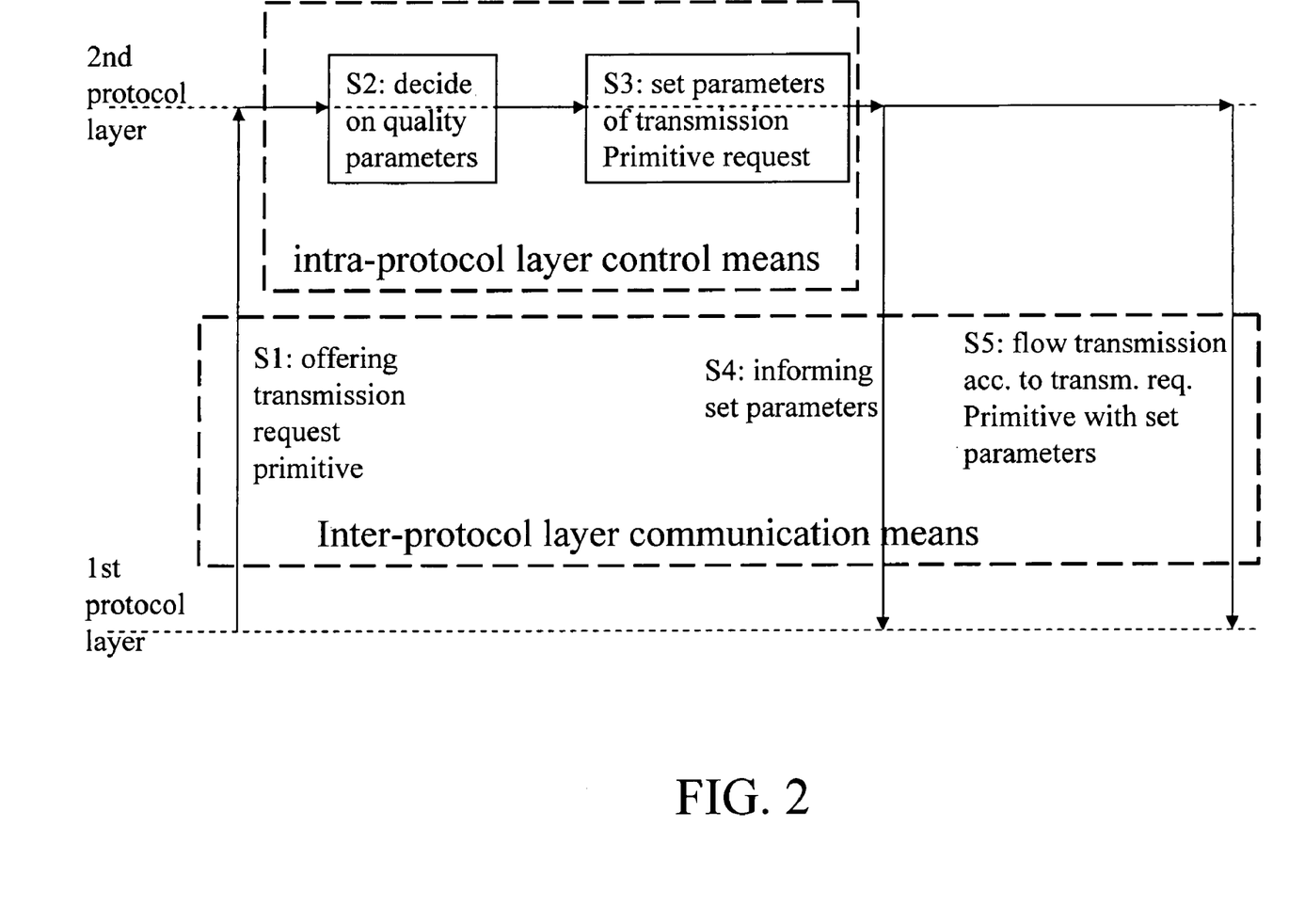
FIG. 2 illustrates a signaling scenario involved in quality level configuration according to an aspect of the present invention.

Such a procedure according to the basic embodiment of this aspect of the present invention is shown in FIG. 2. The inter-layer signaling is shown in vertical direction, while the sequence in time of the signaling and the processing steps involved within a specific layer is represented by the horizontal arrangement of the respective steps.

In a specific modification of the basic embodiment, said transmission request primitive is a flow establishment primitive, and with said flow establishment primitive being set and informed to said first layer, quality parameters for all packets within the flow are configured to have the same properties.

In another specific modification of the basic embodiment, said transmission request primitive is a data request primitive, and with said data request primitive being set and informed to said first layer, a quality parameter for a packet within the flow is configured to have an individual property. More precisely, said data request primitive comprises at least a parameter associated to packet quality level. Furthermore, in a refinement of this another specific modification of the basic embodiment, said data request primitive comprises at least one further parameter associated to an intra-packet segment quality level. In such a refined embodiment, said at least one further parameter associated to an intra-packet segment quality level comprises:

a starting point parameter indicating a starting point of a specific quality of service within the packet, and at least one of the following:

an ending point parameter indicating an end point of a specific quality of service within the packet;

a length indicator indicating an end point of a specific quality of service within the packet with reference to the starting point.

This means that the parameter is at least one of these, i.e. typically either start+end or start+length. The value of "end" and "length" is essentially the same; it just depends on whether you subtract "start" from the parameter. In an exceptional modification "start" alone could be ok, if the assigned quality level continue until the end of the packet, and "end" or "length" alone could mean that the assigned quality level starts from the beginning. However, both of these are just encoding-related technical issues and need not be emphasized here. Other constellations are also conceivable, in particular those which include some redundancy such as start+length+end.

Thus, as derivable from the above description of this first aspect of the invention, different quality levels can be present either in different packets or one packet can contain segments of different quality levels. A quality level is indicated in FIG. 3 by Q1 and/or Q2, generally in the Figures accompanying this document by Qn. More than two quality levels are possible, but not illustrated in these examples to keep the examples easy to describe and to understand.

Depending on whether the required quality segmentation changes for each packet, the upper layer can configure the quality parameters either for the duration of the flow (i.e. for all packets of the flow), or for each packet individually (for all segments of a respective packet), or even for each segment individually within a respective packet.

The packet-based and/or packet-segment based indication of different quality levels can be implemented through inclusion of specific quality parameters into the transmission request primitive, more precisely, the data request primitive offered by the lower layer (first layer) to the upper layer (second layer).

With a data request primitive parameter such as "packet quality level", the upper layer (second layer) sets the parameter (after deciding on the quality of the packets), and signals and/or informs the target quality level for the whole packet to the lower layer (first layer); and sends the packets with the set parameter to the first layer If segments within the packet require separate protection levels ("protection" here denotes also a specific quality), more request parameters are defined. These parameters can be e.g. "Extra protection start pointer", "Extra protection length" and "Extra protection level." They can be defined optional so that they are not present, when different protection levels are not required. Apart from these example parameters, an alternative implementation would be to replace the "Extra protection length" parameter with an "end point" parameter.

That is, packets and/or segments thereof having differing quality levels in every packet are defined with those or similar parameters as described above for packet-based/segment-based protection signaling.

The configuration of quality levels present for a flow (then, all packets of the flow have same properties) is similar to the packet-based approach, but then the parameters need to be included in a local flow establishment primitive (as an example of a transmission request primitive). Thus, a parameter can be included to set the quality level of the whole flow.

The above description has been made with reference to the method steps involved. However, it is to be understood that these method steps are carried out by a specific device.

Namely, under this aspect of the present invention, there is conceived a device for configuring quality parameters in a packet-based transmission flow for packets within the flow. The device comprises an inter-protocol layer communication means S1, S4 as shown in FIG. 2, which is configured to offer, S1, a transmission request primitive from a first protocol layer to a second protocol layer from which the packet-based transmission flow is to be received.

The transmission request primitive comprises at least one parameter for indicating at least one quality parameter for the packets within the packet-based transmission flow, as described above in connection with the method and any modifications thereof.

The device further comprises an intra-protocol layer control means S2, S3, shown in FIG. 2 as being located in and/or logically associated to the second (higher) protocol layer. This control means is configured to decide, S2, at said second protocol layer on the quality parameters for the packets within the flow, and is configured to set, S3, the at least one parameter of the transmission request primitive according to the decided quality. Still further, the inter-protocol layer communication means is configured to inform, S4, the set at least one parameter to the first protocol layer. Also, based on the above, the inter-protocol layer communication means thereafter transmits the packets/segments with the configured quality from the second layer to the first layer, S5.

It is to be noted that any aspect of the present invention can be realized by software or hardware. In case the invention is accomplished using software, the specific realization is not limited to the use of any specific software and/or programming language, as long as the functionality according to the present invention is realized. Further, in case an aspect of the present invention is realized in hardware, it is not relevant which type of hardware is used for the realization. Namely, the present invention can be realized using bipolar technology or MOS technology or CMOS technology, or BiCMOS technology, or any other type of technology or logic circuitry such as TCL or ECL. Still further, a hardware realization may also rely on a specifically designed and/or programmed device of a digital signal processor DSP or an application specific integrated circuit ASIC.

$2^{ND}$ Aspect of the Present Invention:

Transmission of Packet-Based Transmission Flows & Corresponding Transmitter

The notion of "Quality Protocol Data Unit" (QPDU) is established for the layer separating different quality levels in the data stream, i.e. flow of packets. Stated in other words, at the lower layer (first layer), SDU's incoming from a higher layer (second layer) are converted to QPDU's in a manner that a respective QPDU has only packets and/or packet segments belonging to the same quality level.

Generally spoken, under this aspect, the present invention proposes a method of transmitting packet-based transmission flows comprising packets of configured quality classes within a session capable of handling at least two distinguishable flows. A quality class of a flow of the session is set upon flow establishment.

The method comprises the steps of receiving, at a first protocol layer, packets SDU of at least one flow, Flow1, Flow2, as an at least first flow of the session, from a second protocol layer, analyzing, at the first protocol layer, the received packets in terms of the configured quality classes, Q1, Q2, separating, from said at least first flow, those segments of the packets of a configured quality class, which configured quality class differs from a quality class associated to said at least first flow of the session.

In particular, in relation to said separating, there occurs an arranging, i.e. switching of separated segments of the packets to at least one other flow of the session.

According to one embodiment, the arranging of separated segments involves that separated segments are switched to said at least one other flow and are received as packets of a flow of the session, and the received separated segments are again analyzed in terms of the configured quality classes, and those segments of the packets of a configured quality class, which configured quality class differs from a quality class preset for said at least one other flow of the session are separated from the at least one other flow. Insofar, this represents a cascaded evaluation and separation of packets.

Furthermore, according to another modification, as regards arranging of the separated packets, there is a switching of separated segments of the packets to a selected at least one other flow of the session, wherein the respective selected at least one other flow has a quality class preset which matches the quality class of the separated segments. Here, the separated packets/segments are immediately switched to a respective flow (already established or to be established) based on their quality class and/or quality level.

Of course, as mentioned above, there is a step of establishing a new flow of the session in case that there is no flow to which separated segments can be switched to; and also there is a step of establishing a new flow of the session in case that there is no flow having a quality class preset which matches the quality class of the separated segments, to which separated segments can be switched to.

The method is further enhanced by a step of generating a header for each flow of the session to which segments were arranged and/or switched to. The newly generated header serves for management purposes of the flows after separating certain packets/segments and for reconstructing the respective (initial) flows at the receiving side. Such a header comprises a header field for each payload segment within said flow. Note that the header field for each payload segment contains at least a flow identity of the flow from which said segment originates.

The above outlined general principle of this aspect of the invention is described herein below with reference to the drawings.

In the example of FIG. 3 the SDU received in Flow_1 has packets of and/or a packet comprising segments of two different quality levels Q1 and Q2 within the SDU. (A length of a segment may be different for different segments.) The two segments/packets of quality level 1 (Q1) are packed into one QPDU. The segment of quality level Q2 is separated from flow Flow_1 and switched into another flow of a different QPDU, i.e. Flow 2 in the illustrated example. In Flow 2, a packet (or segments of a packet) requiring entirely a quality level of Q2 for the service is received. Attaching both the Q2 segment from flow Flow_1 and the Q2 segment from flow Flow_2, there is formed a modified flow having a QPDU containing packets/segments of Q2 only. Now, as a result, each QPDU only includes content (packets/segments) having one quality level, and the processing involved in error correction coding and (a possible) retransmission on the physical layer can be based on uniform requirements.

For management purposes of the packet flows, when separating and switching certain packets/segments from and/or to a flow, a new header introduced as QPDU header is generated.

Such a new header is added to the QPDU flow constituted by the remaining packets/segments after separation (i.e. QPDU Flow_1) as well as to the QPDU flow constituted by at least the separated packets/segments switched to another flow and the initial SDU's of said another flow (i.e. QPDU Flow_2).

Figure 4:
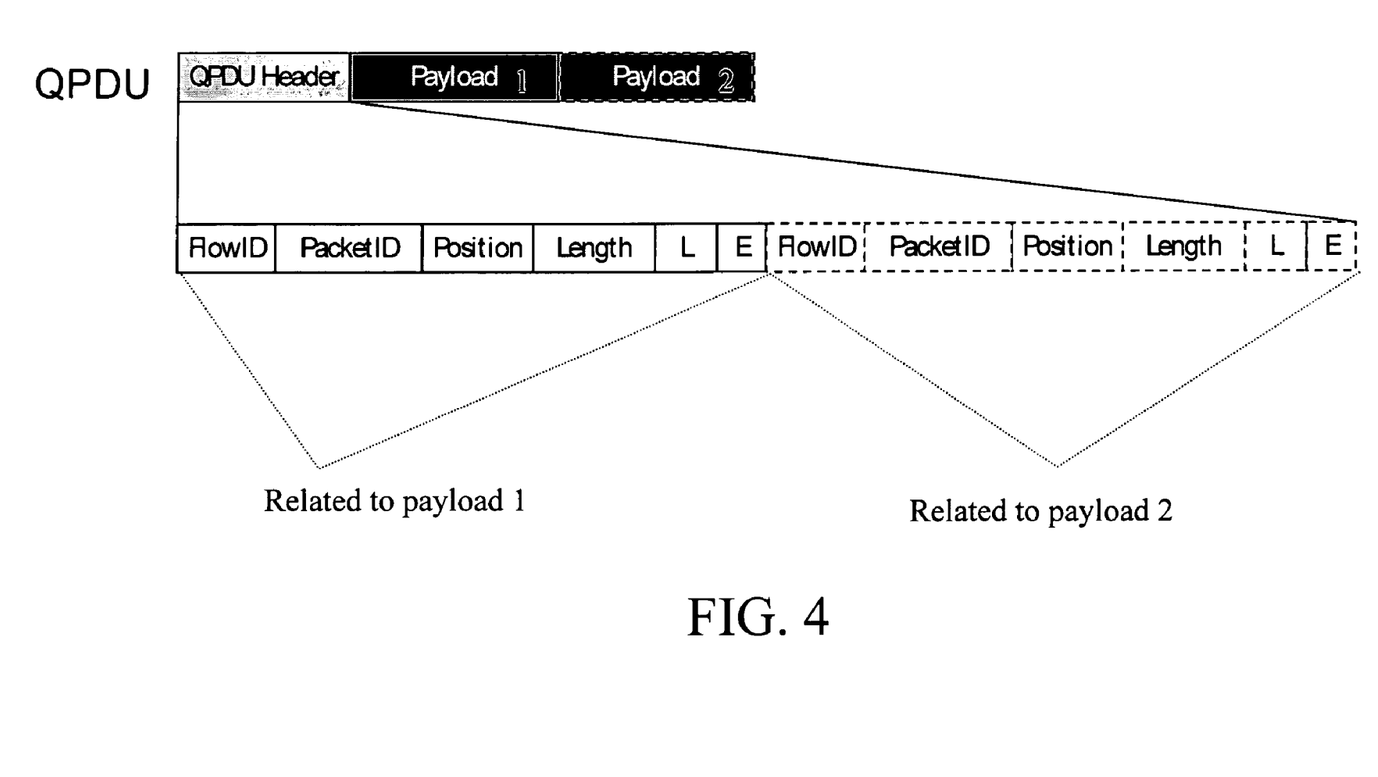
FIG. 4 shows an example of a newly defined QPDU header in accordance with a transmitting method according to the present invention and as used in a receiving method according to the present invention.

An example of such a QPDU header is shown in FIG. 4. The following fields are present for each segment, e.g. payload segment:

Flow ID: Identifies the originating flow. The identifier need not be known to the receiving protocol entity, the receiver only needs to know whether two Flow ID:s are the same or different.

PacketID: SDU counter making sure that the order of packets within a flow is maintained.

Position: Starting position of a segment. Could be defined e.g. such that the granularity is an octet, and a value of zero (0) signifies the first segment of a packet.

Length: Length of the segment in e.g. octets.

L: Last segment flag. This bit is set (1) if this segment is the last one in the SDU. The last segment is marked so that the receiving protocol entity knows, when an SDU is complete and ready to be forwarded to receiving upper layer.

E: Header Extension Flag. If this flag is set (1), another header segment (and another payload segment) are included in the QPDU. For the last header segment in the QPDU, the flag is set to zero (0).

It is important to note that with the header structures presented in this document no peer-to-peer signaling with the receiving end prior to transmission is needed for proper reception.

The current examples are assuming that the paths to process different quality PDU:s are either directly offered by the physical layer or by another sublayer of the radio link layer, and the QPDU header format has no explicit indication of the quality level needed. This quality requirement is assumed to be passed to physical layer in a primitive, and the receiving physical layer will also indicate the arrival of different quality levels separately.

Many additions to 1) the signaling of the packet segment quality levels from the upper layer and 2) the QPDU header could be listed.

1) If the format is made totally selectable, then n segments of different quality levels, each with one-bit precision in the length, could be defined. The examples here show one practical implementation, but finer granularity and configurability can always be achieved through additional complexity.

2) Current example of the QPDU format assumes that only packets destined to one user are transmitted in the same channel. If so desired, also data destined to different users (in cellular downlink) could be multiplexed into the same QPDU for transmission through a common channel. This will then imply the addition of a radio level terminal identifier into the QPDU header. Both above mentioned additions and/or modifications can be present individually or simultaneously.

The above description of FIG. 3 was an example only. Of course, within a specific flow more than two quality levels can be present. Separation of certain packets/segments can be achieved in a direct manner which means that all segments of specific quality levels are arranged to a respective flow (existing or to be established) in a single step. Nevertheless, separation of certain packets/segments can be achieved in a cascaded manner which means that all segments of a quality level different from the quality level of the flow in which they are received are arranged to another flow (existing or to be established), and from that flow segments are again separated, up to a stage in which each flow of the session contains only segments/packets of a single quality level Q.

Notwithstanding the fact that hereinbefore this aspect was described with particular reference to the underlying method, this aspect of the present invention is also realized by a correspondingly configured device.

Namely, this aspect concerns a transmitter for transmitting packet-based transmission flows comprising packets of configured quality classes (Q1, Q2, Q3) within a session capable of handling at least two distinguishable flows (F1, F2). The transmitter comprises an internal receiver configured to receive, at a first protocol layer, packets (SDU) of at least one flow (Flow1, Flow2) as an at least first flow of the session, from a second protocol layer.

This internal receiver is comparable to the inter-protocol communication means mentioned in connection with FIG. 2, more precisely, to a receiver functionality thereof.

The transmitter comprises further an analyzer configured to analyze, at said first layer, the received packets in terms of the configured quality classes Q1, Q2, and a separator configured to separate, from said at least first flow, those segments of the packets of a configured quality class (Q2), which configured quality class differs from a quality class (Q1) associated to said at least first flow of the session.

Said separator further comprises an internal switch configured to arrange separated segments of packets to at least one other flow (Flow2, Flow3) of the session.

In a specific modification, said internal switch is configured such that the separated segments Q2 are switched to said at least one other flow and are received as packets of a flow Flow2 of the session at a further internal receiver which is configured such that the received separated segments Q2 are analyzed in terms of the configured quality classes, and a further separator which is configured such that those segments Q3 of the packets of a configured quality class, which configured quality class differs from a quality class Q2 preset for said another flow Flow2 of the session are separated from said at least one other flow Flow2.

Note that also some hardware components such as a "further separator" are addressed as distinct units, they may be physically the same but operated in a different point of time under different configurations.

The internal switch is configured to switch separated segments Q2 of the packets to a respective selected at least one other flow Flow2 of the session, wherein the respective selected at least one other flow Flow2 has a quality class Q2 preset which matches the quality class of the separated segments.

Also, said internal switch is configured to establish a new flow of the session in case that there is no flow present, to which separated segments can be arranged to, and also said internal switch is configured to establish a new flow of the session in case that there is no flow present having a quality class preset which matches the quality class of the separated segments, to which separated segments can be switched to.

The transmitter further comprises a generating means configured to generate a header (QPDU) for each flow of the session from which segments were separated. This generating means can be associated to the separator, for example. The generating means is configured to generate a header QPDU for each flow of the session to which segments were arranged, and said generating means is configured to compose the header such that the header comprises a header field for each payload segment within said flow.

The transmitter comprises a setting means configured to set a quality class of a flow of the session upon flow establishment. The setting means exchanges necessary information with the analyzer and the separator and thus represents at least part of a session control entity. The header field for each payload segment contains at least a flow identity of the flow from which said segment originates.

Figure 5:
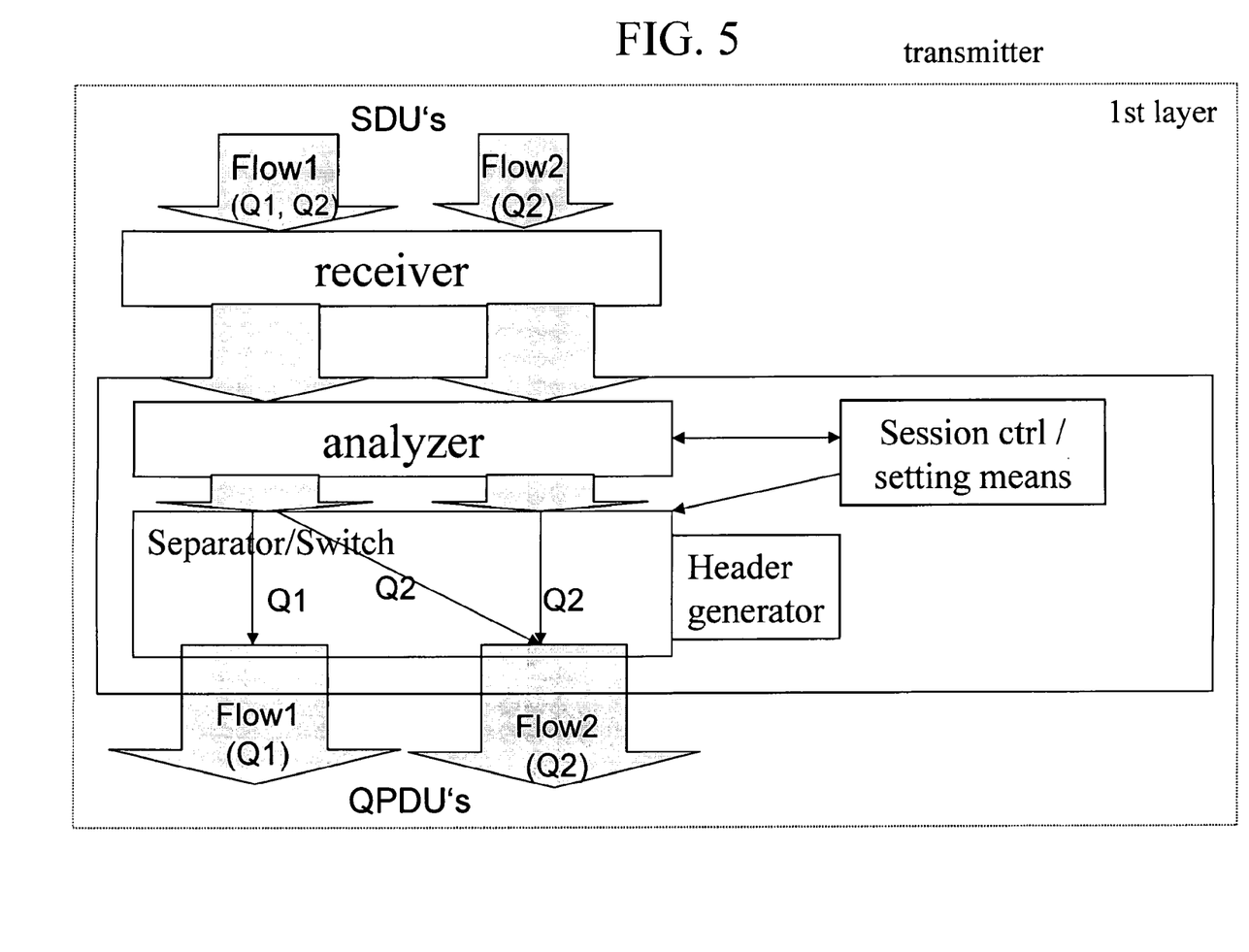
FIG. 5 shows a schematic block circuit diagram of a transmitter according to the present invention.

A basic block circuit diagram illustrating in outline the structure of a corresponding transmitter is shown in FIG. 5. Fig, by means of which the previously described functionality is achieved for the transmission.

$3^{RD}$ Aspect of the Present Invention:

Reception of Packet-Based Transmission Flows (Transmitted According to the Second Aspect) & Corresponding Receiver Under this aspect of the present invention, a method of receiving packet-based transmission flows comprising segments of packets within a session capable of handling at least two distinguishable flows is described. The method basically comprises the steps of receiving, in a peer-to-peer communication at a first protocol layer, segments of packets QPDU of at least one flow Flow1, Flow2 as an at least first flow of the session. In a further step the received segments of packets are analyzed on said first protocol layer in terms of a flow identity associated to each segment, and the segments of the packets having a flow identity which differs from the flow identity of said at least first flow of the session are separated from said at least first flow of the session.

Said separating further comprises a step of arranging separated segments of packets to at least one other flow Flow2 of the session. In this regard, said arranging comprises combining those separated segments of packets to segments of packets of a respective other one of said flows of the session having a flow identity which is identical to the flow identity associated to the separated segments of the packets.

According to a modification, said arranging comprises that the separated segments Q2 are switched to said at least one other flow Flow2 and are received as packets of a flow Flow2 of the session, the received separated segments Q2 are analyzed in terms of the associated flow identity, and those segments of the packets of a specified flow identity, which associated flow identity differs from a flow identity preset for said another flow Flow2 of the session are separated from said at least one other flow Flow2. Similar as in the transmission scenario, this represents a cascaded processing in terms of separating.

The method comprises further a step of switching those separated segments Q2 of the packets to a respective selected at least one other flow Flow2 of the session, wherein the respective selected at least one other flow Flow2 has a flow identity preset which is identical to the flow identity of the separated segments.

Also, in a certain refinement of the method, said arranging further comprises a step of de-establishing (or terminating) a flow of the session in case the flow identity associated to all segments of packets of the flow differs from the flow identity associated to the flow.

Of course, said received at least one flow comprises a header comprising a header field for each payload segment, as it was transmitted in accordance with the transmission aspect of the present invention. Also, a flow identity of a flow of the session is set upon flow establishment. (And a flow identity is removed and thus available for future use in case of de-establishment of a flow.) Still further, said header field for each payload segment contains a flow identity associated to the respective segment.

Figure 6:
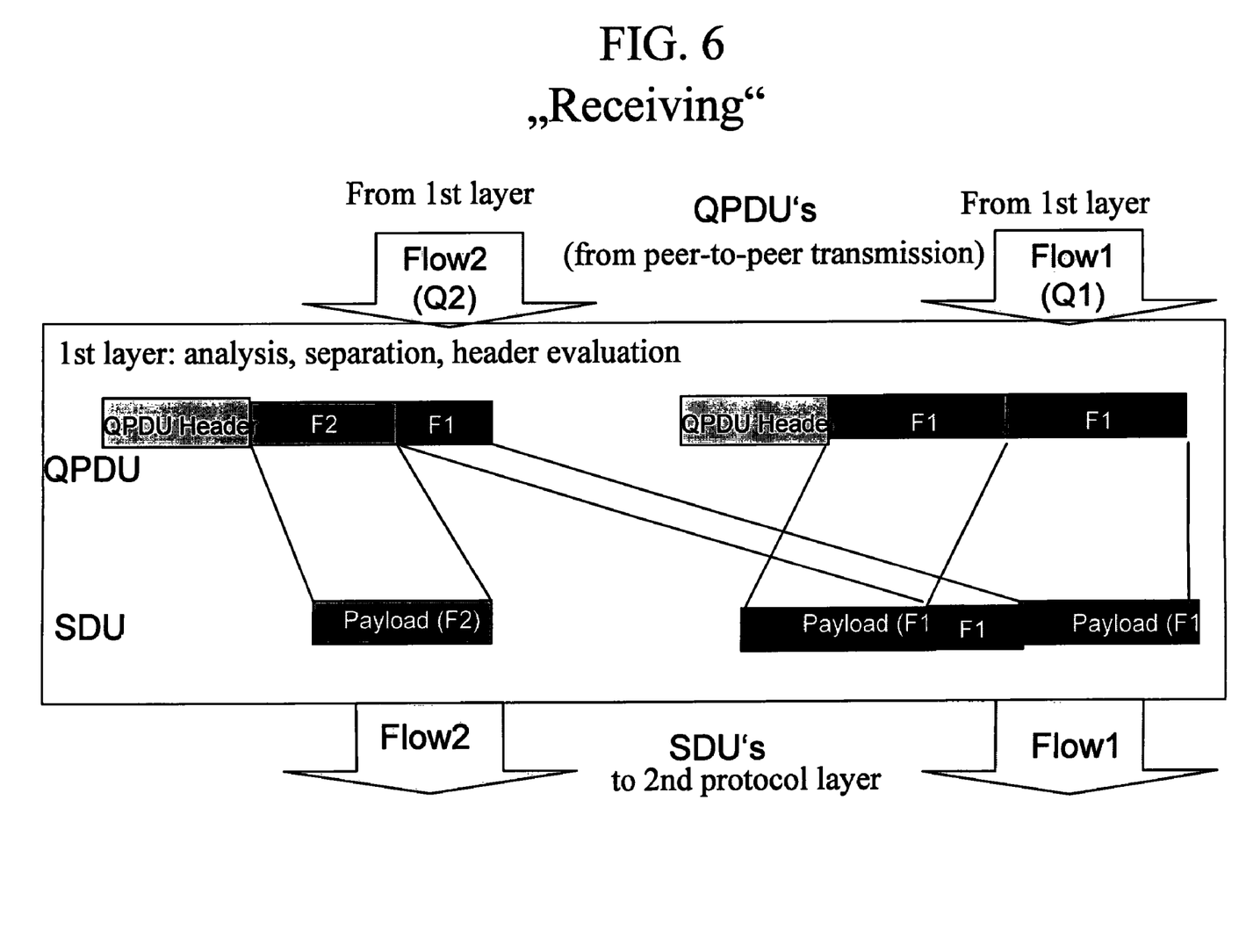
FIG. 6 shows an example of a segmentation of Quality Protocol Data Units (QPDU's) as performed in a receiver.

The above outlined method steps will be described in detail with regard to an example illustrated in FIG. 6. FIG. 6 assumes a similar case for reception as it was shown in FIG. 3 for transmission in order to illustrate the similarities/correspondence between these aspects. Namely, the reception is the complementary or reverse operation as compared to the transmission.

As shown in FIG. 6, in a peer-to-peer communication from a transmitter to a receiver on a first protocol layer, flows Flow2 and Flow1 are received in the shown example. Both flows are those flows transmitted from the transmitter as shown in FIG. 3.

That is, Flow2 contains packets/segments having quality Q2 only, and Flow1 contains packets/segments having quality Q1 only. The packets/segments are received as QPDU's being provided with a QPDU header generated at the transmitter side. The QPDU header contains, for each segment, at least a flow identifier or identity specifying the flow from which the packet/segment originates. FIG. 6 illustrates this flow identifier as F1, F2, respectively. Thus, Flow 2 is analyzed and based on the analysis that a payload packet/segment of flow identity F1 is contained therein, this segment is separated from Flow2 and arranged to Flow1 which has the same identity as the flow identity associated to the segment concerned. The payload packet/segment of Flow1 identity is thus switched back to Flow1. Similar processing is applied to Flow1. However, since in the transmitter side (FIG. 3) Flow 1 only contained packets/segments with origin (identity) of Flow 1, no separation (re-arranging or switching) is conducted on packets/segments of Flow1 in this example.

Rather, the packet/segment "F1" re-arranged from Flow2 to Flow1 is inserted again in the Flow1. The insertion position is selected such that the original sequence of the transmitted packets is reconstructed. This is accomplished based on the "packet ID" and/or segment ID also maintained at the QPDU header. After the above described processing, Flow1 and Flow2 contain packets/segments of a single flow identity only and are passed to a higher protocol layer such as the second layer.

Figure 7:
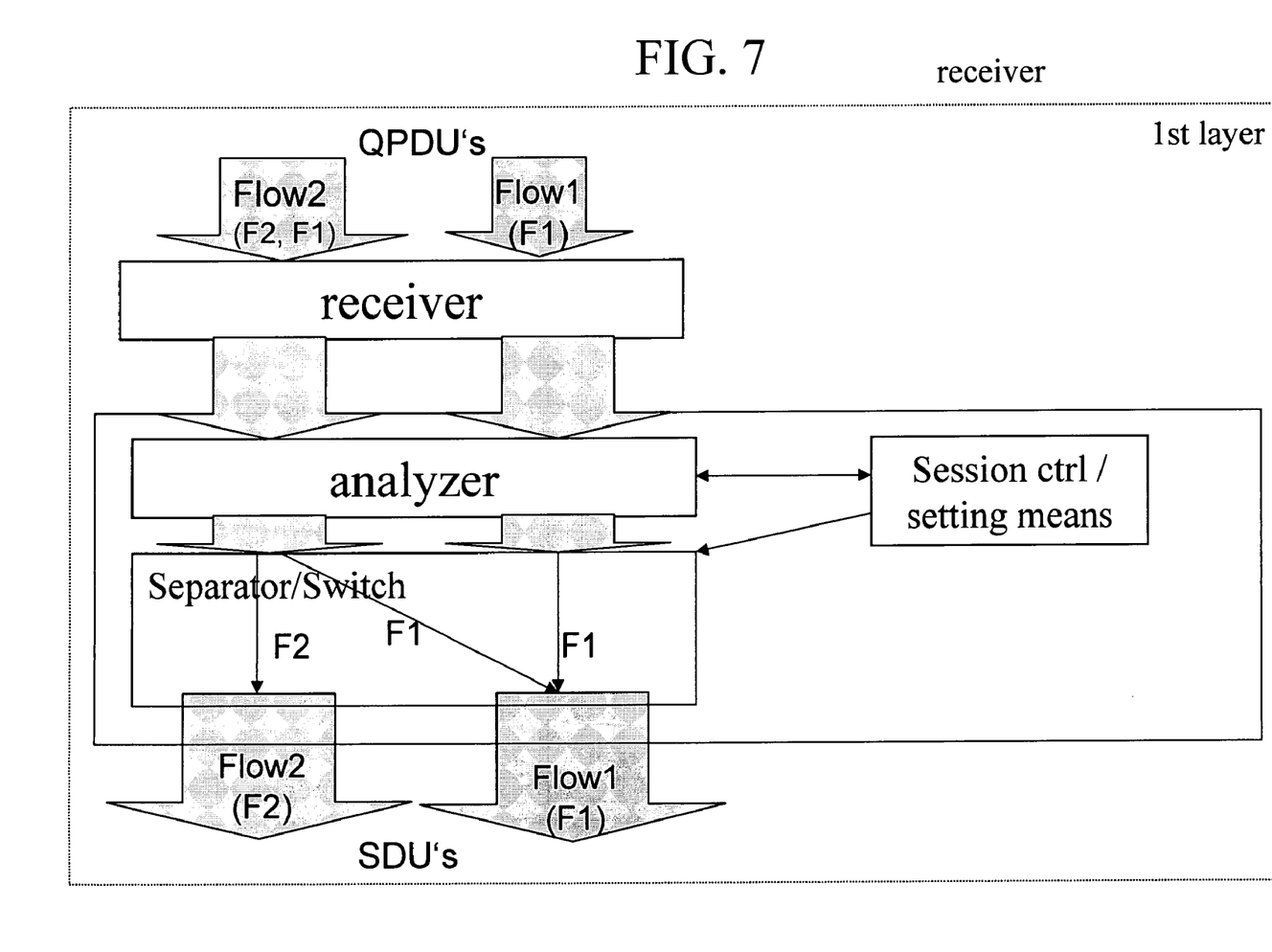
FIG. 7 shows a schematic block circuit diagram of a receiver according to the present invention.

FIG. 7 shows a block circuit diagram of the receiver device configured to perform the reception as described above.

That is, FIG. 7 shows a receiver for receiving packet-based transmission flows comprising segments of packets within a session capable of handling at least two distinguishable flows. The receiver basically comprises a receiving means configured to receive, in a peer-to-peer communication at a first protocol layer, segments of packets, QPDU, of at least one flow Flow1, Flow2 as an at least first flow of the session, an analyzer configured to analyze, at said first protocol layer, the received segments of packets in terms of a flow identity associated to each segment, and a separator configured to separate from said at least first flow of the session those segments of the packets having a flow identity which differs from the flow identity of said at least first flow of the session.

Further, in relation to said receiver, said separator further comprises an internal switch configured to re-arrange separated segments of packets to at least one other flow, Flow1, of the session. The internal switch is configured to combine those separated segments of packets to segments of packets of a respective other one of said flows of the session having a flow identity which is identical to the flow identity associated to the separated segments of the packets.

In a specific modification, the internal switch is configured such that the separated segments, F1, are switched to said at least one other flow and are received as packets of a flow of the session, the received separated segments are analyzed in terms of the associated flow identity, and those segments of the packets of a specified flow identity, which associated flow identity differs from a flow identity preset for said another flow of the session are separated from said at least one other flow. Insofar, a cascaded processing can be realized.

Furthermore, in a specific modification, said internal switch is configured to switch those separated segments F1 of the packets to a respective selected at least one other flow Flow1 of the session, wherein the respective selected at least one other flow has a flow identity preset which is identical to the flow identity of the separated segments.

Still further, internal switch is configured to de-establish a flow of the session in case the flow identity associated to all segments of packets of the flow differs from the flow identity associated to the flow.

As described above, said received at least one flow comprises a header comprising a header field for each payload segment, and a flow identity of a flow of the session is set upon flow establishment. Said header field for each payload segment contains a flow identity associated to the respective segment.

In the foregoing, various aspects of the present invention have now been fully described. As a first aspect, configuring quality parameters has been described so that a quality of service can be configured in accordance with the present invention on a packet basis or on a packet segment basis. With such configuration, in transmission as a second aspect of the present invention, flows comprising packets/segments of different quality are in a certain way "sorted" so that a respective flow (on a peer-to-peer layer) contains only packets of a single quality, but which may originate from different flows. An information on the originating flow of a respective packet/segment is maintained in a newly generated header. At the receiving side, in reception, according to a third aspect of the present invention, a respective flow of packets/segments is analyzed in terms of different originating flow identifications. Based on this, the packets/segments are "re-sorted" in a manner so as to reconstruct the originating flows. The present invention does not only describe the corresponding methods but also the transmitter and receiver devices which are configured according to the present invention and the respective aspects thereof.

Accordingly, as has been described herein above, the present invention concerns a method of configuring quality parameters in a packet-based transmission flow for packets within the flow, and still further a method of transmitting packet-based transmission flows comprising packets of configured quality classes within a session capable of handling at least two distinguishable flows, the method comprising the steps of: receiving packets of a first flow as a first flow of the session, analyzing the received packets in terms of the configured quality classes, separating those segments of the packets of a configured quality class, which configured quality class differs from a quality class of said first flow of the session.

LIST OF ABBREVIATIONS

AMR Adaptive Multirate
CRC Cyclic Redundancy Check
GSM Global System for Mobile communications
ID Identifier
IP Internet Protocol
MAC Medium Access Control
PDU Protocol Data Unit
QoS Quality of Service
QPDU Quality PDU
SDU Service Data Unit
WCDMA Wideband Code Division Multiple Access

The invention claimed is:

1. A method, comprising:
providing for transmitting packet-based transmission flows comprising packets of configured quality classes within a session capable of handling at least two distinguishable flows, the method further comprising
receiving, at a first protocol layer, packets of at least one flow as an at least first flow of the session, from a second protocol layer;
analyzing, at said first layer, the received packets in terms of the configured quality classes; and
separating, from said at least first flow, those segments of the packets of a configured quality class, which configured quality class differs from a quality class associated to said at least first flow of the session, the separated segments of the packets arranged into at least one other flow of the session, such that a new flow of the session is established in case that there is no flow present or in case that there is no flow present having a quality class preset which matches the quality class of the separated segments, to which the separated segments can be arranged into, the newly established flow being used to transmit multiple packet segments;
wherein one or more of the at least first flow and the newly established flow are configured to be de-established in response to a determination based on flow identities associated with received packets and flow identities associated with the one or more of the at least first flow and the newly established flow.

2. The method according to claim 1 further comprising:
switching the separated segments to said at least one other flow and receiving the separated segments as packets of a flow of the session;
analyzing the received separated segments in terms of the configured quality classes; and
separating those segments of the packets of a configured quality class from said at least one other flow, wherein said configured quality class differs from a quality class preset for another flow of the session.

3. The method according to claim 1, further comprising
switching the separated segments of the packets to a respective selected at least one other flow of the session, wherein the respective selected at least one other flow has a quality class preset which matches a quality class of the separated segments.

4. The method according to claim 1, further comprising generating a header for each flow of the session from which segments were separated.

5. The method according to claim 4, wherein said header comprises a header field for each payload segment within said each flow.

6. The method according to claim 5, wherein the header field for each payload segment contains at least a flow identity of the flow from which said segment originates.

7. The method according to claim 1, further comprising generating a header for each flow of the session to which segments were arranged.

8. The method according to claim 1, wherein a quality class of a flow of the session is set upon flow establishment.

9. A method, comprising:
providing for receiving packet-based transmission flows comprising segments of packets within a session capable of handling at least two distinguishable flows, the method further comprising
receiving, in a peer-to-peer communication at a first protocol layer, segments of packets of at least one flow as an at least first flow of the session;

analyzing, at said first protocol layer, the received segments of packets in terms of a flow identity associated to each segment; and separating from said at least first flow of the session those segments of the packets having a flow identity which differs from the flow identity of said at least first flow of the session, the separated segments of packets arranged into at least one other flow of the session, wherein the arrangement de-establishes a flow of the session in case the flow identity associated to all segments of packets of the flow differs from the flow identity associated to the flow.

10. The method according to claim 2, wherein said arranging comprises:

combining the separated segments of packets to segments of packets of a respective other one of said flows of the session having a flow identity which is identical to the flow identity associated to the separated segments of the packets.

11. The method according to claim 9 further comprising:

switching the separated segments to said at least one other flow and receiving the separated segments as packets of a flow of the session, analyzing the received separated segments in terms of the associated flow identity, and separating those segments of the packets of a specified flow identity from said at least one other flow, wherein said associated flow identity differs from a flow identity preset for another flow of the session.

12. The method according to claim 9, further comprising switching the separated segments of the packets to a respective selected at least one other flow of the session, wherein the respective selected at least one other flow has a flow identity preset which is identical to the flow identity of the separated segments.

13. The method according to claim 9, wherein said received at least one flow comprises a header comprising a header field for each payload segment.

14. The method according to claim 13, wherein said header field for each payload segment contains a flow identity associated to the respective segment.

15. The method according to claim 9, further comprising setting up the flow identity of a flow of the session upon flow establishment.

16. An apparatus, comprising an internal receiver configured to receive, at a first protocol layer, packets of at least one flow as an at least first flow of the session, from a second protocol layer, wherein packet-based transmission flows comprise packets of configured quality classes within a session capable of handling at least two distinguishable flows;

an analyzer configured to analyze, at said first protocol layer, the received packets in terms of the configured quality classes; and a separator configured to separate, from said at least first flow, those segments of the packets of a configured quality class, which configured quality class differs from a quality class associated to said at least first flow of the session, an internal switch configured into arrange the separated segments of packets to at least one other flow of the session the internal switch is configured to establish a new flow of the session in case that there is no flow present or in case that there is no flow present having a quality class preset which matches the quality class of the separated segments, to which the separated segments can be arranged into, the newly established flow being used to transmit multiple packet segments;

wherein one or more of the at least first flow and the newly established flow are configured to be de-established in response to a determination based on flow identities associated with received packets and flow identities associated with the one or more of the at least first flow and the newly established flow.

17. The apparatus according to claim 16, wherein the internal switch is configured such that:

the separated segments are switched to said at least one other flow and are received as packets of a flow of the session;

at a further internal receiver which is configured such that the received separated segments are analyzed in terms of the configured quality classes; and a further separator which is configured such that those segments of the packets of a configured quality class, which configured quality class differs from a quality class preset for said another flow of the session are separated from said at least one other flow.

18. The apparatus according to claim 16, wherein said internal switch is configured:

to switch the separated segments of the packets to a respective selected at least one other flow of the session, wherein the respective selected at least one other flow has a quality class preset which matches the quality class of the separated segments.

19. The apparatus according to claim 16, further comprising a generator configured to generate a header for each flow of the session from which segments were separated.

20. The apparatus according to claim 19, wherein:

said generator is configured to compose the header such that the header comprises a header field for each payload segment within said each flow.

21. The apparatus according to claim 20, wherein:

the header field for each payload segment contains at least a flow identity of the flow from which said segment originates.

22. The apparatus according to claim 16, further comprising a generator configured to generate a header for each flow of the session to which segments were arranged.

23. The apparatus according to claim 22, wherein:

said generator is configured to compose the header such that the header comprises a header field for each payload segment within said each flow.

24. The apparatus according to claim 23, wherein:

the header field for each payload segment contains at least a flow identity of the flow from which said segment originates.

25. The apparatus according to claim 16, comprising:

a setting unit configured to set a quality class of a flow of the session upon flow establishment.

26. An apparatus, comprising:

a receiving unit configured to receive, in a peer-to-peer communication at a first protocol layer, segments of packets of at least one flow as an at least first flow of the session, wherein packet-based transmission flows comprise segments of packets within a session capable of handling at least two distinguishable flows, an analyzer configured to analyze, at said first protocol layer, the received segments of packets in terms of a flow identity associated to each segment, and a separator configured to separate from said at least first flow of the session those segments of the packets having a flow identity which differs from the flow identity of said at least first flow of the session, an internal switch configured to re-arrange the separated segments of packets into at least one other flow of the session, wherein the internal switch is configured to de-establish a flow of the session in case the flow identity associated to all segments of packets of the flow differs from the flow identity associated to the flow.

27. The apparatus according to claim 26, wherein said internal switch is configured to:
combine the separated segments of packets to segments of packets of a respective other one of said flows of the session having a flow identity which is identical to the flow identity associated to the separated segments of the packets.

28. The apparatus according to claim 27, wherein said internal switch is configured
to switch the separated segments of the packets to a respective selected at least one other flow of the session, wherein the respective selected at least one other flow has a flow identity preset which is identical to the flow identity of the separated segments.

29. The apparatus according to claim 26, wherein the internal switch is configured such that
the separated segments are switched to said at least one other flow and are received as packets of a flow of the session, the received separated segments are analyzed in terms of the associated flow identity, and those segments of the packets of a specified flow identity, which associated flow identity differs from a flow identity preset for said flow of the session are separated from said at least one other flow.

30. The apparatus according to claim 26, wherein said internal switch is configured
switch the separated segments of the packets to a respective selected at least one other flow of the session, wherein the respective selected at least one other flow has a flow identity preset which is identical to the flow identity of the separated segments.

31. The apparatus according to claim 25, wherein said received at least one flow comprises a header comprising a header field for each payload segment.

32. The apparatus according to claim 31, wherein said header field for each payload segment contains a flow identity associated to the respective segment.

33. The apparatus according to claim 26, wherein:
the flow identity of a flow of the session is set upon flow establishment.

34. A computer program, embodied on a non-transitory computer readable storage medium, the computer program configured to control a processor to perform operations comprising:
providing for transmitting packet-based transmission flows comprising packets of configured quality classes within a session capable of handling at least two distinguishable flows, the operations further comprising:
receiving, at a first protocol layer, packets of at least one flow as an at least first flow of the session, from a second protocol layer;
analyzing, at said first layer, the received packets in terms of the configured quality classes; and
separating, from said at least first flow, those segments of the packets of a configured quality class, which configured quality class differs from a quality class associated to said at least first flow of the session, the separated segments of packets arranged into at least one other flow of the session, such that a new flow of the session is establishes in case that there is no flow present or in case that there is no flow present having a quality class preset which matches the quality class of the separated segments, to which the separated segments can be arranged to, the newly established flow being used to transmit multiple packet segments;
wherein one or more of the at least first flow and the newly established flow are configured to be de-established in response to a determination based on flow identities associated with received packets and flow identities associated with the one or more of the at least first flow and the newly established flow.

35. A computer program, embodied on a non-transitory computer readable storage medium, the computer program configured to control a processor to perform operations comprising:
providing for receiving packet-based transmission flows comprising segments of packets within a session capable of handling at least two distinguishable flows,
the operations further comprising
receiving, in a peer-to-peer communication at a first protocol layer, segments of packets of at least one flow as an at least first flow of the session;
analyzing, at said first protocol layer, the received segments of packets in terms of a flow identity associated to each segment; and
separating from said at least first flow of the session those segments of the packets having a flow identity which differs from the flow identity of said at least first flow of the session, the separated segments of packets arranged to at least one other flow of the session, wherein the arrangement de-establishes a flow of the session in case the flow identity associated to all segments of packets of the flow differs from the flow identity associated to the flow.

* * * * *